United States Patent [19]

Erion et al.

[11] 3,907,329
[45] Sept. 23, 1975

[54] SHOULDER HARNESS POSITIONER

[75] Inventors: Jeffrey A. Erion, Dearborn Heights; Richard E. Peel, Farmington Hills, both of Mich.

[73] Assignee: Ford Motor Company, Dearborn, Mich.

[22] Filed: Aug. 30, 1974

[21] Appl. No.: 502,113

[52] U.S. Cl. ............................. 280/150 SB; 297/389
[51] Int. Cl.² .......................................... B60R 21/10
[58] Field of Search ........ 280/150 SB; 297/388, 389

[56] References Cited
UNITED STATES PATENTS

| | | | |
|---|---|---|---|
| 3,810,657 | 5/1974 | Campbell | 280/150 SB |
| 3,829,123 | 8/1974 | Holka | 280/150 SB |

Primary Examiner—Robert R. Song
Attorney, Agent, or Firm—John J. Roethel; Keith L. Zerschling

[57] ABSTRACT

An improved shoulder harness positioner for raising a segment of the shoulder harness from a position in which it obstructs access to the rear passenger compartment of a two-door sedan-type vehicle. The positioner comprises a lift means for raising a guide loop mounted on the vertically adjustable headrest of a backrest structure, the segment of the shoulder harness passing through the guide loop.

The lift means comprises a lift member, preferably tubular, that telescopically extends through guide means in the backrest structure and the headrest, the guide means being movable with the headrest relative to the backrest structure. An extension member slidably axially projects from the upper end of the lift member and supports the guide loop above the headrest. Interlocking means on the lift member and extension member permit limited axial movement of the extension member relative to the lift member.

The lift means, in response to forward tilting movement of the backrest structure, is movable upwardly in the guide means to raise the extension member and guide loop to lift the shoulder harness out of substantial interference with the passageway to the compartment rear space.

4 Claims, 4 Drawing Figures

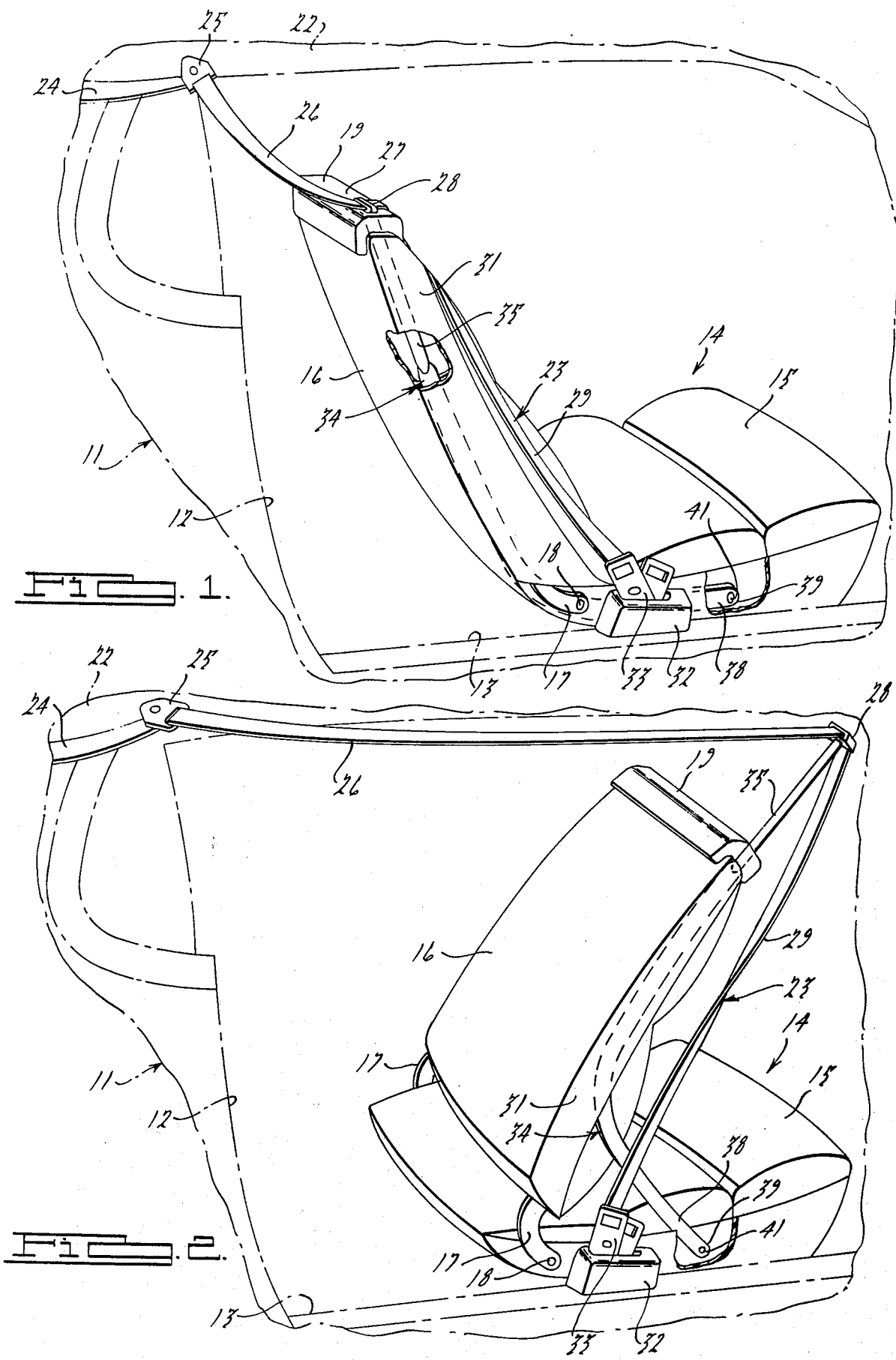

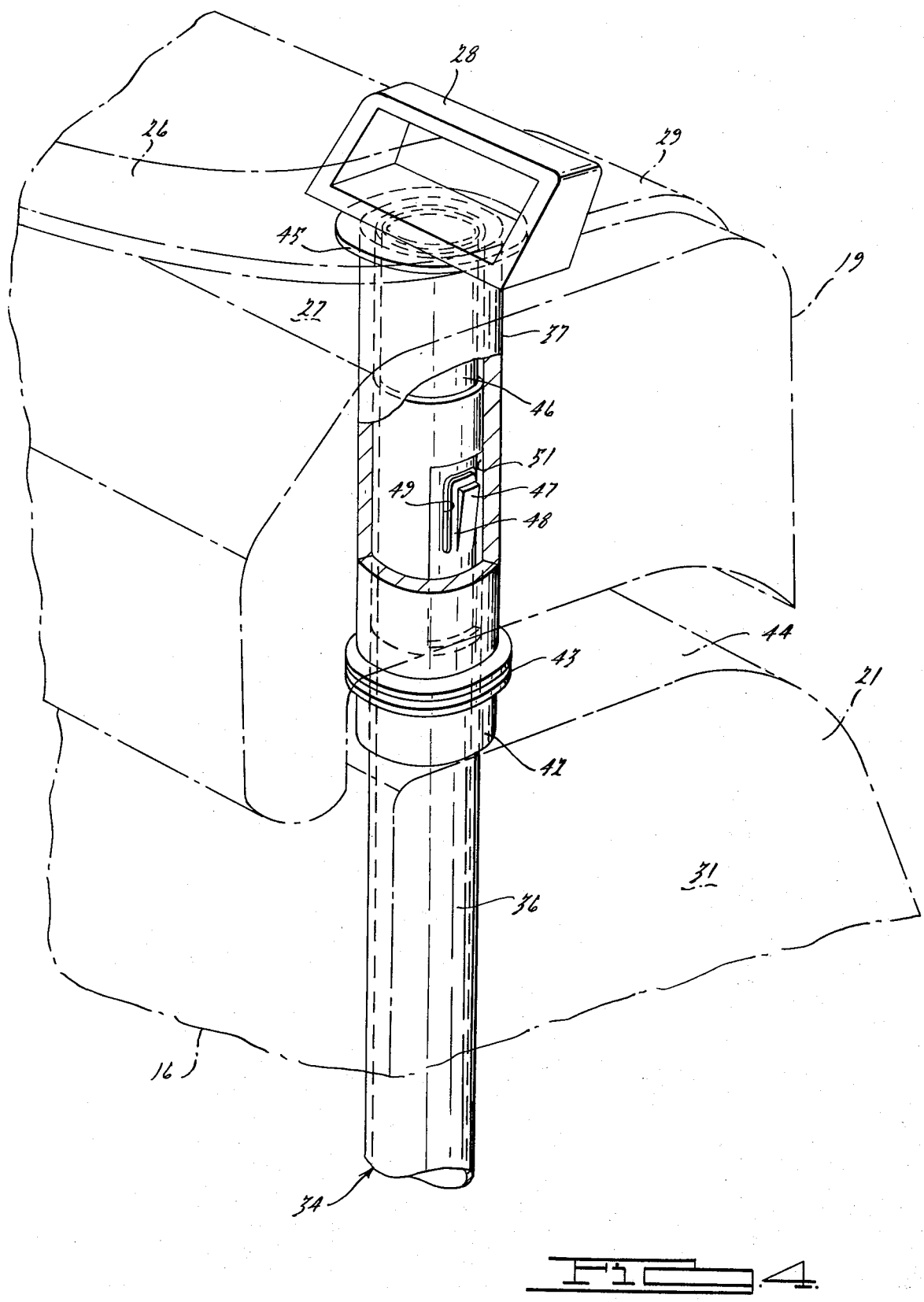

SHOULDER HARNESS POSITIONER

BACKGROUND OF THE INVENTION

The seat belt passenger restraint system currently in use on motor vehicles comprise a lap belt and a shoulder harness that are of the "must wear" type. That is, the buckle end of the shoulder harness is permanently connected to the buckle end of the lap belt so that both must be worn to obtain the passenger restraint function. When the seat belts are not in use, the lap belt is retracted into a floor mounted retractor and the shoulder harness extends from a guide loop attached to the passenger compartment ceiling down to the floor retractor. This presents a problem in two-door sedan-type vehicles, in particular. In such vehicles the front seat is forwardly tiltable to enlarge the passageway between the front seat and the adjacent rear body pillar leading to the rear seats. The hanging harness cuts across the enlarged passageway in position to entangle anyone entering or leaving the vehicle.

It is an object of the present invention to provide a lift mechanism for raising the interferring shoulder harness toward the compartment roof, the mechanism being actuated upon the seat back being forwardly tilted to enlarge the passageway to the rear seats.

SUMMARY OF THE INVENTION

A shoulder harness positioner in accordance with the present invention is adapted for use in a motor vehicle having body structure defining a passenger compartment and having a forwardly facing passenger seat assembly mounted within the compartment. The seat assembly has a seat cushion structure, a backrest structure forwardly tiltable about an axis adjacent the rear end of the seat cushion to provide an enlargeable passageway to the compartment space rearwardly of the seat assembly, and a vertically adjustable headrest supported on the upper end of the backrest structure. A first guide loop is located within the passenger compartment above and rearwardly of the seat assembly and a second guide loop is located on top of the headrest structure adjacent the outboard side of the latter. A shoulder harness extends from the first guide loop through the second guide loop downwardly over the backrest structure to a nondetachable connection with a lap belt coupled to a retractor mounted on the body structure at the outboard side of the seat assembly. A segment of the shoulder harness between the first and second guide loops normally extends angularly across the passageway in position to interfere with access through the latter to the vehicle body space behind the front seat assembly.

In accordance with the present invention a lift means is provided that comprises a lift member which telescopically extends through guide means in the backrest structure and headrest, the guide means being movable with the headrest relative to the backrest structure. An extension member is slidably mounted in and axially projects from the upper end of the lift member for adjustment and supports the second guide loop above the headrest. Interlocking means on the lift member and extension member permit limited axial movement of the extension member relative to the lift member.

In response to forward tilting movement of the backrest structure, the lift means is movable upwardly to raise the extension member and second guide loop to lift the shoulder harness out of interference with the passageway to the compartment rear space.

DESCRIPTION OF THE DRAWINGS

Further features and advantages of the present invention will be made more apparent as this description proceeds, reference being had to the accompanying drawings, wherein:

FIG. 1 is a perspective view of a vehicle seat assembly showing a shoulder harness in relation to the seat assembly when the seat is unoccupied;

FIG. 2 is a view in part similar to FIG. 1 illustrating a shoulder harness segment raised to the roof of the vehicle by a lift mechanism to facilitate ingress or egress to or from the vehicle body area behind the seat assembly;

FIG. 4 is an enlarged view in part similar to FIG. 3 illustrating the relationship of the parts of the lift mechanism when the headrest structure is in a raised position relative to the top of the seat backrest structure.

DETAILED DESCRIPTION OF THE INVENTION

Figure 3:
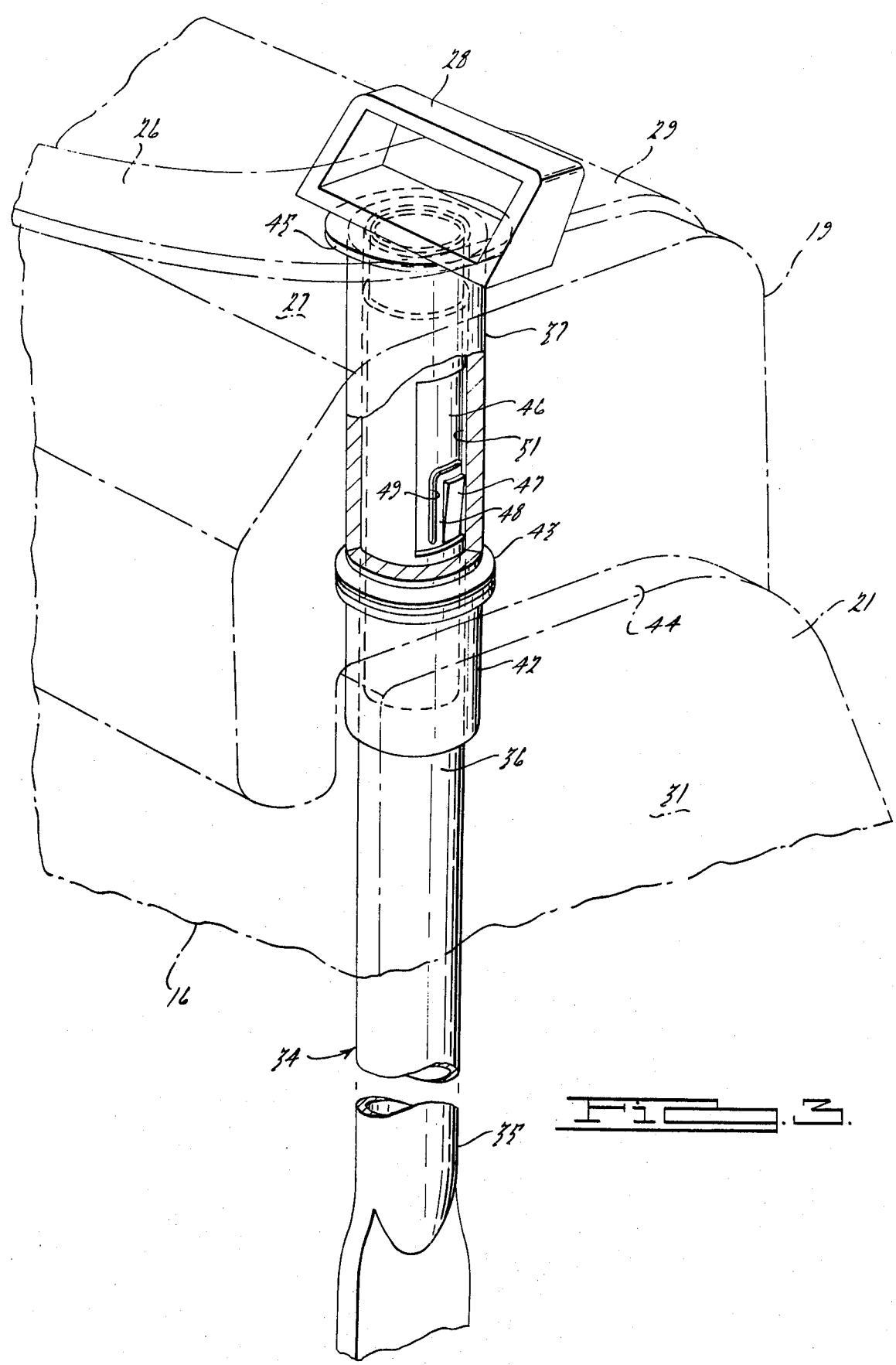
FIG. 3 is an enlarged view of the upper portion of the seat backrest structure illustrating details of the lift mechanism embodying the present invention.

Referring now to the drawings, there is shown in FIGS. 1 and 2 in dot and dash outline a vehicle body, generally designated 11, having a door opening 12 and a floor structure 13. A seat assembly 14 is supported on the floor structure 13, the seat assembly having a seat cushion structure 15 and a backrest structure 16 forwardly tiltable over the seat cushion structure 15. The backrest structure 16 is supported for tilting movement on hinge arms 17 pivoted on hinge pins 18 located near the rear end of the seat cushion structure 15. A vertically adjustable headrest 19 is supported on the upper end 21 of the backrest structure.

Reference may be made to the U.S. Pat. No. 3,563,603 issued Feb. 16, 1961 to J. F. D'Aprile et al. for "Headrest Assembly" for an exemplification of an adjustably mounted headrest.

A seat assembly, such as a seat assembly 14, having a tiltable backrest structure 16 is conventionally used in a two-door sedan vehicle, the backrest structure 16 being forwardly tiltable to enlarge the ingress or egress passageway between the door pillar and the seat assembly leading to the vehicle body compartment space rearwardly of the seat. It has been found, however, that in two-door sedans equipped with passenger restraint or seat belt systems having a shoulder harness, the passageway to the rear seats may be obstructed by the shoulder harness which has a tendency to hang down into the door opening because of the location of its upper anchor point. In past model years, the inconvenience of the hanging shoulder harness could be avoided by not using the shoulder harness. It could be left folded against the side roof rail 22, as shown in U.S. Pat. No. 3,532,361 issued Oct. 6, 1970 to T. F. Hrynik for a "Vehicle Shoulder Harness Stowage Means". This could be done when the shoulder harness buckle element was disconnectable from the lap belt buckle element. Safety regulations now require, however, the nondisconnectable system so that the shoulder harness must be worn when the lap belt is worn. No provision is made for roof side rail stowage.

U.S. patent application Ser. No. 376,764 filed July 5, 1973, now U.S. Pat. No. 3,829,123, issued Aug. 13, 1974, for a "Seat Belt Positioner", by Thomas C. Holka, and assigned to the assignee of the present application discloses a mechanism for eliminating the interference of the shoulder harness with access to the vehicle body space behind the front seat assembly 14. To correct the interference condition, a lift means carried on the backrest structure is positioned to underlie the shoulder harness. A drive means responsive to forward tilting movement of the backrest structure is operable to raise the lift means and thereby the segment of the shoulder harness toward the roof rail to an extended substantially parallel relationship to the latter out of interference with access to the vehicle body space behind the seat assembly.

The lift means embodied in the Holka application was particularly adapted for use with a seat backrest structure having an integral or nonmovable headrest structure. The lift means embodied in the present invention is adapted to be used with a vertically adjustable headrest.

As shown in FIG. 1, the shoulder harness, generally designated 23, has a first belt segment 24 which extends rearwardly to a roof rail mounted retractor (not shown) and forwardly through a swivelly-mounted D ring 25. The belt segment 26 forwardly of the D ring 25 extends downwardly and forwardly to the top 27 of the headrest 19 where it passes through a second belt guide loop 28 which is movably supported on the backrest structure 16, as will be explained. From the belt guide loop 28, the harness 23 has a belt segment 29 extending down the outboard side 31 of the backrest structure 16 to a retractor mechanism 32. The terminal end of the belt segment 29 is coupled to a nondetachable shoulder harness, lap belt (not visible) and D ring assembly indicated at 31.

As shown in FIG. 1, the intermediate shoulder harness segment 26 cuts across the passageway between the body pillar defining the rear edge of the door opening 12 and the backrest structure 16. When the backrest structure 16 is tilted forwardly to enlarge the passageway, the harness segment 26 becomes elongated and is capable of dropping across the passageway in position to entangle a person seeking ingress or egress to or from the space in the compartment to the rear of the seat assembly 14.

In accordance with the present invention, this is prevented by lifting the shoulder harness segment 26 toward the roof rail 22 as the backrest tilts forwardly.

As in the Holka mechanism, the seat assembly 14 has associated therewith an L-shaped lift member 34 having an upstanding leg portion 35 which at its upper end 36 passes through an elongated bushing or tube 37. The base leg 38 of the lift member is pivotally mounted at its terminal end 39 on the seat cushion frame by a pivot bolt 41, the pivot axis defined by the bolt 41 being forward of the backrest pivot axis 18. As a result, when the backrest structure 16 is tilted forwardly, the base leg 38 functions as a drive means urging the lift member upstanding leg portion 35 upwardly relative to the bushing 37.

The bushing 37 is housed within the headrest 19 and has an extension 42 projecting through a grommet 43 in the upper surface 44 of the backrest structure 16. The upper end of the bushing 37 has a flange 45 which lies beneath the upper cushioned surface 27 of the headrest 19.

The upper end 36 of the lift member leg 35 is tubular and is slidable within the bushing 37. Telescopically slidable within the upper tubular end portion 36 of the leg 35 is another tubular member 46 — herein called an extension member. This extension member carries the guide loop 28 through which the shoulder harness passes.

The extension member 46 is adapted to be installed after the seat assembly 14 is upholstered and trimmed. Accordingly, the side wall of the tubular extension member is provided with at least one wedge-shaped detent 47 that sits on a base portion 48 of the tubular wall which is bordered on three sides by a slot 49. This base portion 48 is thus made resilient to permit the wedge portion to move inwardly as the extension 46 is telescopically inserted in the lift member tubular end portion 36. The tubular end portion 36 has a slot 51 through which the wedge 47 projects, the wedge when aligned with the wall of the tubular end portion 36 functioning as a detent to prevent withdrawal of the extension 46 from the lift member tubular end portion 36.

The slot 51 has sufficient length to accommodate substantial variations in the thickness of the headrest cushioned cover 27, or even more important, the thickness of a person's hand inadvertently resting between the headrest surface 27 and the guide loop 28 at a time when the seat back is moved from a forwardly tilted position to an upstanding position. The slot 51 has sufficient width to permit reasonable turning movement of the extension 46 to insure substantial alignment of the shoulder harness with the guide loop 28 as the backrest structure 16 is tilted and returned to an upright position or as the harness is pulled across the seat occupant's torso.

A comparison may be made between FIGS. 3 and 4 to demonstrate the relationship of the telescoping members when the headrest 19 is moved from a position (see FIG. 3) in which it abuts the top 44 of the seat backrest structure 21 to a position (see FIG. 4) in which it is spaced from the top 44. When the headrest 19 is raised, the grommet 43 in the seat back top 44 does not move. The lift member 34 and therefore its upper tubular end 36 also remain in a fixed position relative to the seat backrest structure. As the headrest structure 19 is lifted to a raised position, the bushing 37 and its integral extension 42 are lifted upwardly with the extension 42 sliding within the grommet 43. The main body portion of the bushing 37 also slides up the exterior surface of the tubular end portion 36 of the lift member 34.

The guide loop 28 is lifted as the headrest 19 is raised causing the extension member 46 affixed to the guide loop 28 to be telescopically raised within the tubular end portion 36 of the lift member 34. Accordingly, the detent 47 on the wall of the extension member 46 moves upwardly within the slot 51 in the wall of the tubular end portion 36. The detent 47 thus is adapted to provide a stop restricting withdrawal of the extension member 46 from the tubular end portion 36 of the lift member 34. It is also adapted to limit the extent to which the headrest 19 may be raised relative to the top 44 of the seat backrest structure.

It will be noted that in FIG. 4 there is a greater space between the upper end of the lift member 34 and the underside of the guide loop 28 than there is in the FIG. 3 relationship. This has no affect on the operation of the mechanism other than permitting more lost motion between the abutting parts as the lift member 34 moves upwardly toward the guide loop 28. The ultimate raised position of the guide loop 28 remains the same regardless of its initial position relative to the top 44 of the seat backrest structure.

It is to be understood that this invention is not limited to the exact construction illustrated and described above, but that various changes and modifications may be made without departing from the spirit and scope of the invention defined by the following claims:

We claim:

1. A shoulder harness positioner for use in a motor vehicle having body structure defining a passenger compartment and a forwardly facing passenger seat assembly mounted within the compartment, the seat assembly having a seat cushion structure a backrest structure forwardly tiltable about an axis adjacent the rear end of the seat cushion to provide an enlargeable passageway to the compartment space rearwardly of the seat assembly, and a vertically adjustable headrest supported on the upper end of the backrest structure, a first guide loop located within the passenger compartment above and rearwardly of the seat assembly, and a shoulder harness extending from the first guide loop through the second guide loop downwardly over the backrest structure to a nondetachable connection with a lap belt coupled to a rectractor mounted on the body structure at the outboard side of the seat assembly, a segment of the shoulder harness between the first and second guide loops normally extending angularly across the passageway in position to interfere with access to the latter, wherein the improvement comprises:

a lift means having a lift member telescopically extending through guide means in the backrest structure and headrest, the guide means being movable with the headrest relative to the backrest structure, and extension member slidably axially projecting from the lift member and supporting the second guide loop above the headrest, interlocking means on the lift member and extension member permitting limited axial movement of the extension member relative to the lift member, the lift means in response to forward tilting movement of the backrest structure being movable in the guide means to raise the extension member and second guide loop to lift the shoulder harness out of interference with the passageway to the compartment rear space.

2. A shoulder harness positioner according to claim 1, in which:

the guide means comprises a cylindrical tubular bushing, the lift member upper portion is also cylindrical and tubular, and the extension member is cylindrical and fits within the tubular upper portion of the lift member.

3. A shoulder harness positioner according to claim 2, in which:

the interlocking means on the lift member and extension member comprises a resiliently mounted detent means on the exterior side wall of the extension member, and slot means in the wall of the lift member tubular portion receiving the detent means.

4. A shoulder harness positioner according to claim 3, in which:

the slot means receiving the detent means is elongated and of greater width than the detent means permitting both telescoping and angular movement of the tubular extension within the lift member tubular portion.

* * * * *